FIG. 12.

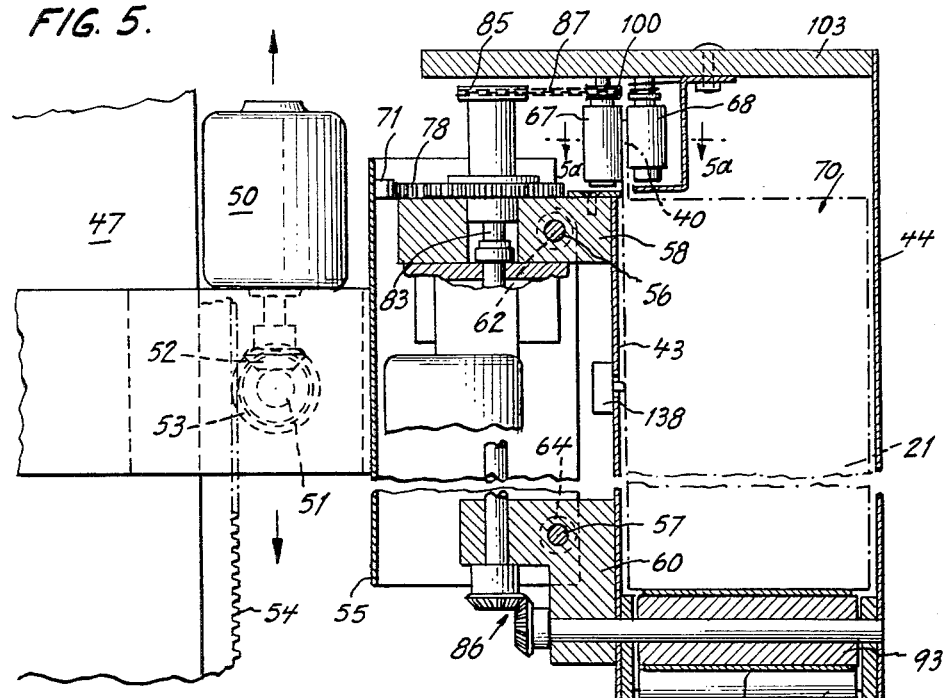
FIG. 5.
FIG. 5a.
FIG. 5b.
FIG. 6.

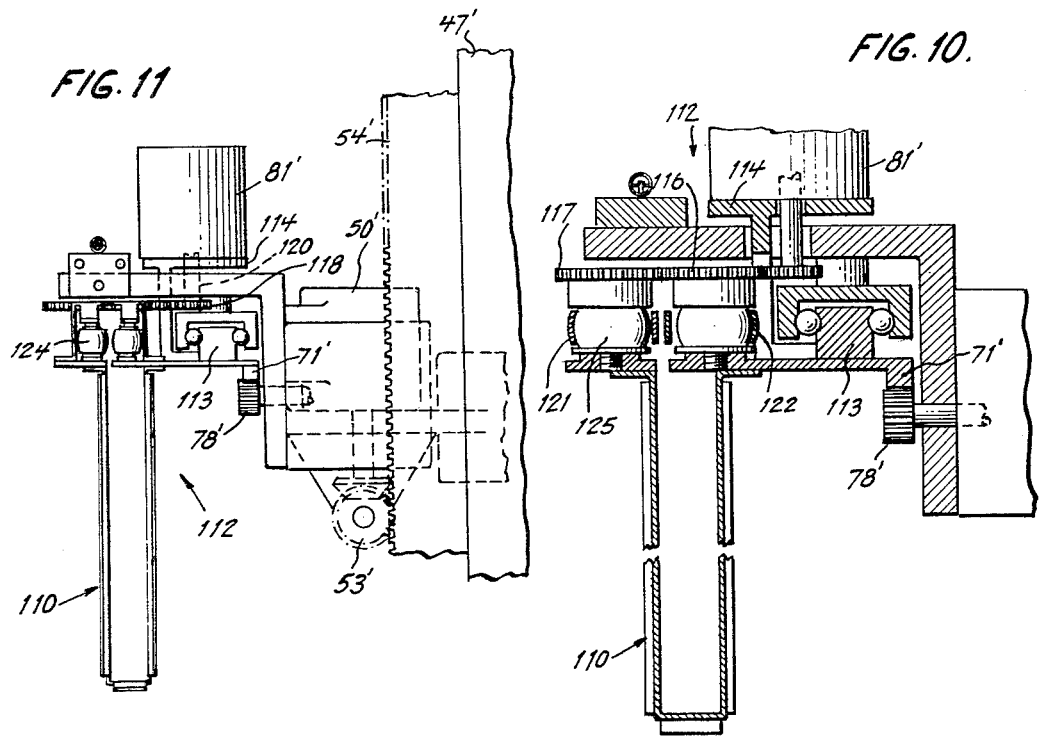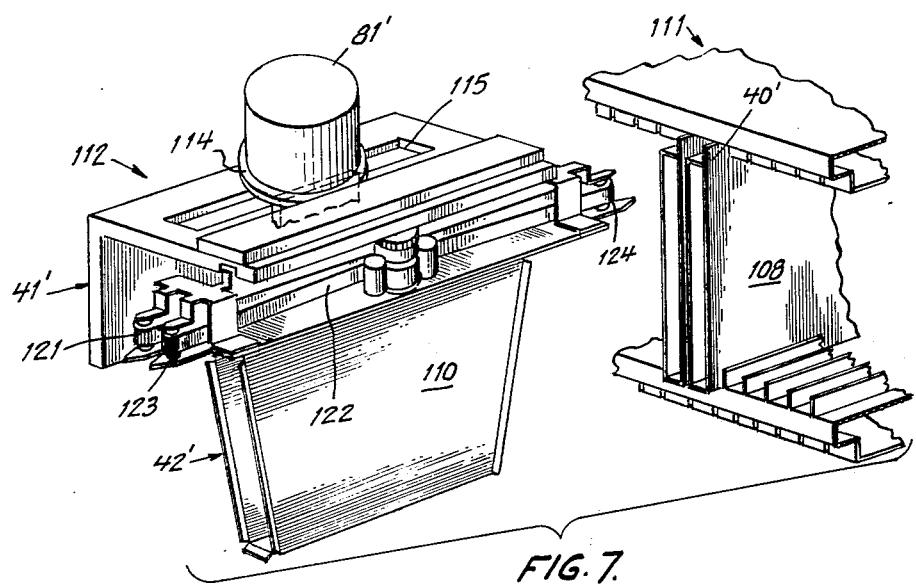

| PULL | FILE |
|---|---|
| APPARATUS IDLE EXTRACTOR AT HOME POSITION | APPARATUS IDLE EXTRACTOR AT HOME POSITION |
| INSTRUCTIONS PROVIDED AT CONTROL UNIT | INSTRUCTIONS PROVIDED AT CONTROL UNIT |
| EXTRACTOR DRIVEN TO SELECTED ADDRESS BY HORIZONTAL AND VERTICAL DRIVE MECHANISM | EXTRACTOR DRIVEN TO POSITION ADJACENT RETURN CONVEYOR SELECTED. |
| CONTAINER EXTRACTED (LEFT OR RIGHT) | CONTAINER TRANSFERED FROM CONVEYOR TO EXTRACTOR |
| EXTRACTOR DRIVEN TO POSITION ADJACENT PULL CONVEYOR | EXTRACTOR DRIVEN TO SELECTED ADDRESS BY HORIZONTAL AND VERTICAL DRIVE MECHANISM |
| CONTAINER DISCHARGED ONTO PULL CONVEYOR | CONTAINER DISCHARGED ONTO STORAGE SHELF (RIGHT OR LEFT) |
| EXTRACTOR RETURNED TO HOME POSITION | EXTRACTOR RETURNED TO HOME POSITION |
| KEYBOARD CLEARED | KEYBOARD CLEARED |

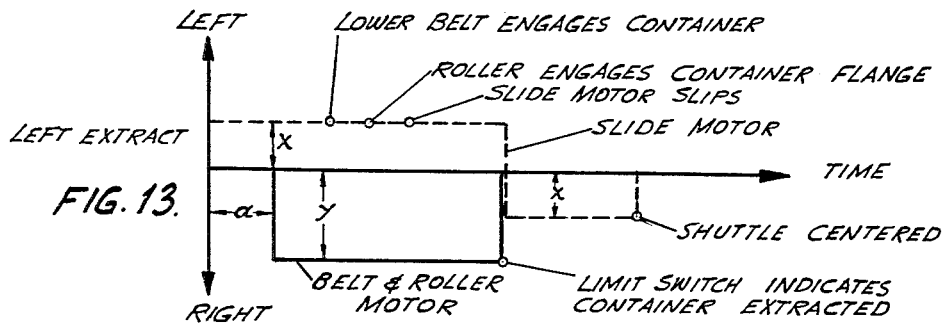

FIG. 13.

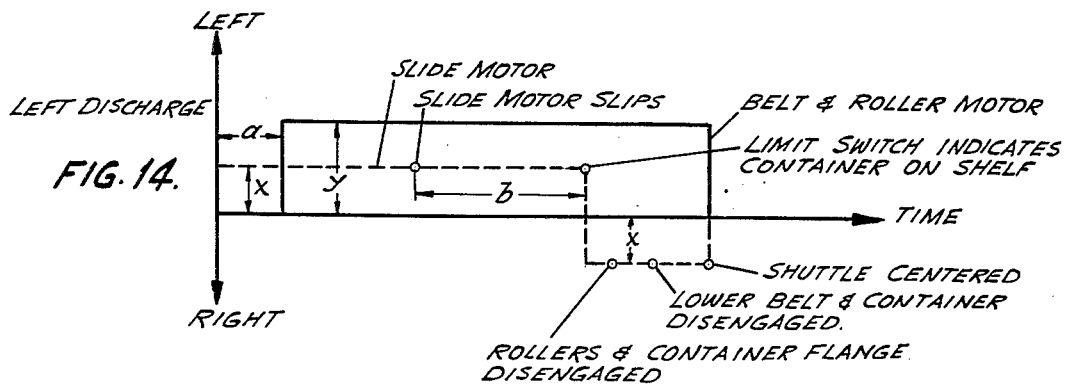

FIG. 14.

United States Patent Office 3,473,675
Patented Oct. 21, 1969

3,473,675
ARTICLE HANDLING APPARATUS
Freeland R. Goldammer and Joseph A. Powers, Williamsville, N.Y., assignors to Sperry Rand Corporation, New York, N.Y., a corporation of Delaware
Filed Feb. 23, 1967, Ser. No. 618,119
Int. Cl. B65j 3/00; B65g 47/34
U.S. Cl. 214—1               13 Claims

ABSTRACT OF THE DISCLOSURE

Apparatus for transferring articles between a storage area and a remote operator work station. A translating mechanism, adapted to selectively position an extractor adjacent any one of a plurality of stored article carrying containers, which extractor is operable to withdraw a selected container and carry it to a discharge area, whereupon the container is deposited on a conveying device which ultimately delivers the articles to a convenient work station. When it is desirable to refile a withdrawn container, the apparatus, adapted to function in a reverse manner, returns any removed container to the storage area from which it was initially withdrawn.

Background of the invention

The present invention relates to article handling apparatus of the nature described above and more particularly to new and useful improvements in the extractor mechanism.

It is well known in the article handling art to provide automated equipment for extracting and/or filing a plurality of articles, wherein the articles are individually stored when not in use. The extraction and storage functions can be accomplished by any of several known methods. For example, a transport mechanism having automatic or manual controls may be provided whereby a carrier is selectively positionable adjacent any one article which is stored at a random address in a storage cabinet, or the like. The article is identified by a code which in turn facilitates the utilization of means for indexing the controls of a drive for the transport mechanism. If the articles are stored in a rectangular array, such as is common in ordinary storage shelving, then the drive mechanism is enabled by appropriate coded commands to position the transport mechanism relative to the stored article along mutually perpendicular axes prior to article extraction. The storage function may be carried out in a similar manner utilizing a vacant storage position or, alternatively, storage can be a simple manual operation.

In article handling apparatus of the type generally referred to hereinabove, for obvious reasons it is desirable to employ means for extracting articles from, and restoring article to, the associated storage means in an efficient and reliable manner. It is further desirable, as in any automatic equipment, to reduce operator error to an absolute minimum while carrying out its related functions in an economical and relatively trouble free manner. Article handling apparatus of the general nature referred to above is readily adaptable for use in library, warehouse and office storage systems as well as banking, insurance and government facilities, or the like, where efficient access to stored records is a continued problem with which they are faced. Many times the actual storage area is at a remote location with respect to the work station at which the articles are delivered for inspection, use or disposition as desired in accordance with the nature of the business involved. It is evident that trouble free operation is most desirable in any of the mentioned applications and especially those in which a remote storage area is employed. Faced with these problems the applicants have provided novel apparatus featuring an extractor mechanism which facilitates reliable operation, eliminates errors in filing and refiling, and in general enables automatic article handling in an easy and efficient manner.

Summary

The present invention contemplates article handling apparatus of the type referred to in the above abstract. An improved extractor mechanism is provided which includes a shuttle portion positionable adjacent any selected one of a plurality of stored article carrying containers. Each container has a unique configuration including a main body portion for receiving information media, such as original documents in file folders. The shuttle is utilized during the translation cycle of such selected container between the storage means and a remote operator station. More specifically, the shuttle portion is specifically adapted to engage the selected container and effect withdrawal and restoration thereof. In a similar manner the novel device and container is adapted to receive from and deposit the selected container on a conveyance device which is utilized during the overall transfer cycle of a selected device between storage and operator station.

In one embodiment the extractor mechanism is adapted for use in an information storage and retrieval system whereby the shuttle includes a container receiving compartment selectively positionable adjacent any one of the article carrying containers stored on suitable support means. A transport mechanism for the extractor disposes the shuttle in a neutral position adjacent a selected container, whereupon appropriate drive means are initiated to effect the engagement between shuttle and selected container. More specifically, the engagement effects complete transfer of the selected container from the stored position to the compartment, which transfer is automatically effected by novel structure which precludes jamming and obviates the problem of operator intervention for manually assisting in the transfer. This permits remote storage and affords increased storage capacity. For example, the containers may be efficiently stored in a face-to-face parallel shelving array, such as the type commonly used in library book stacks, but requiring much less space between the stacks.

Still further, the shuttle and container arrangement contemplated makes possible operation of the shuttle to withdraw and restore articles on both sides of the aisle. The specific details enabling the carrying out of this feature are explained in detail in the following description; however, it should be pointed out that it is evident from the above comments that the compactness made possible by applicants' novel arrangement permits the aisle width to be limited to slightly more that the width of one container and further the congruity of applicants' structure enables operation to both sides of the aisle.

The foregoing and other objects, features and advantages of the invention will appear more fully hereinafter from a consideration of the detailed description which follows, in conjunction with the accompanying sheets of drawings wherein one principal embodiment and other alternative embodiments of the invention are illustrated by way of examples. It is to be expressly understood however, that the drawings are for illustrative purposes only and are not to be construed as defining the limits of the invention.

Brief description of the drawings

FIG. 5 is a sectional view taken along line 5—5 of FIG. 3.

FIG. 5a is a sectional view taken along line 5a–5a of FIG. 5.

FIG. 5b is a sectional view similar to FIG. 5a.

FIG. 6 is a partial side view of the extractor and associated container structure shown in FIG. 2.

FIG. 7 is a perspective view illustrating a second embodiment of the extractor mechanism and an associated container.

FIG. 10 is a partial sectional view taken along line 10—10 of FIG. 8.

FIG. 11 is an end view of the mechanism shown in FIG. 8.

FIG. 12 is a sequence chart describing the general operation of the article handling apparatus shown in FIG. 1.

FIG. 13 is a diagram illustrating an extraction operation.

FIG. 14 is a diagram illustrating a filing operation.

Description of the preferred embodiments

Figure 1:
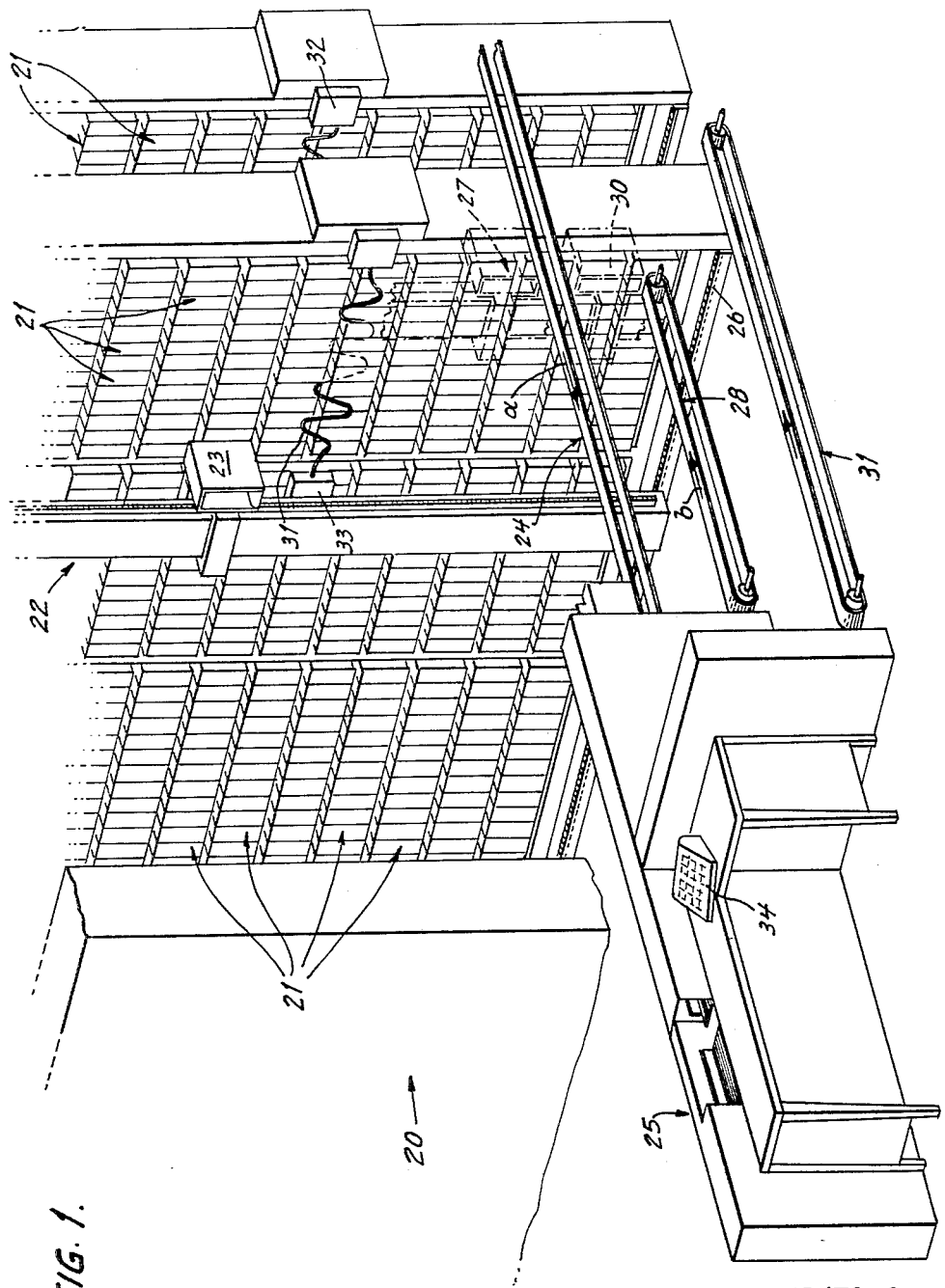
FIG. 1 is a perspective view of an article handling system in which the improved extractor mechanism embodying the present invention may be readily employed.

Now referring to the drawings for a more detailed description, article handling apparatus is diagrammatically shown in FIG. 1, to illustrate by way of example the type of equipment in which one embodiment of the present invention is readily employed. The reference numeral 20, generally designates a storage area in which a plurality of article carrying containers 21 are supported in side-by-side relationship on a parallel shelf array. Each interior shelf is adapted to accommodate two rows of containers in library stack fashion permitting normal accessibility from both sides of the shelf. For exemplary purposes, only two aisles are illustrated. A transport mechanism 22, carrying an extractor 23, is disposed in each aisle for translation of a selected container to conveyor 24 for delivery to the operation work station 25. Conveyor 24 is driven (by means not shown in full) in the direction of arrow a to deliver containers deposited thereon to operator work station 25. The transport mechanism is driven by suitable drive means, e.g., worm gear 26, to horizontally position extractor 23. Likewise, a suitable drive arrangement (described in further detail hereinafter) is provided to position the extractor vertically. In this manner the container carrying section of the extractor may be accurately positioned adjacent any selected container stored for access in the first aisle. A similar extractor operates in the second aisle.

The above described drive arrangement enables extractor 23 to be positioned adjacent conveyor 24 as shown in phantom outline 27. In this position the extractor deposits a container on the conveyor belt for delivery to operator work station 25. It should be noted that the term "extractor" is used throughout this description in its broad sense in that it is intended to encompass a mechanism which functions in a refiling (or discharging) capacity as well as a withdrawing (or extracting) manner.

Now turning to the filing function of the apparatus, a return conveyor 28 is driven by means not fully shown in the direction of arrow b. Containers placed automatically or manually on return conveyor 28 are delivered to extractor 23 under conditions where the extractor is disposed in the position illustrated by phantom outline 30. In a like manner a second return conveyor 31 can be used to return containers to a corresponding second extractor and aisle in the system. The conveyor means shown are commonly used in the manner illustrated and therefore no further details are shown. The present invention resides in the extractor mechanism and article carrying container associated therewith, which arrangement gives rise to an improved translating mechanism, and the system of FIG. 1 is merely shown to depict one of the many operational environments for which the invention is suitable.

Electrical control for the vertical drive is provided by means of cable 31 draped in a conventional manner between a control unit 32 and a junction box 33 on transport mechanism 22. If desirable, this cable can be eliminated by utilizing sliding contacts or a trolley arrangement. Thus, it can be seen that the position of extractor 23 can be controlled by a keyboard control unit 34 at a remote location, by utilizing appropriately timed energizing signals to position extractor 23 along mutually perpendicular axes. Keeping in mind the general nature of the extractor mechanism, the details thereof will now be described whereupon it will become apparent how a selected container is removed from or restored to a preselected storage location. It will also be clear as to the transfer of a container between the extractor and the conveyor system employed in the translation cycle of a container to and from a remote location, such as operator work station 25.

Figure 2:
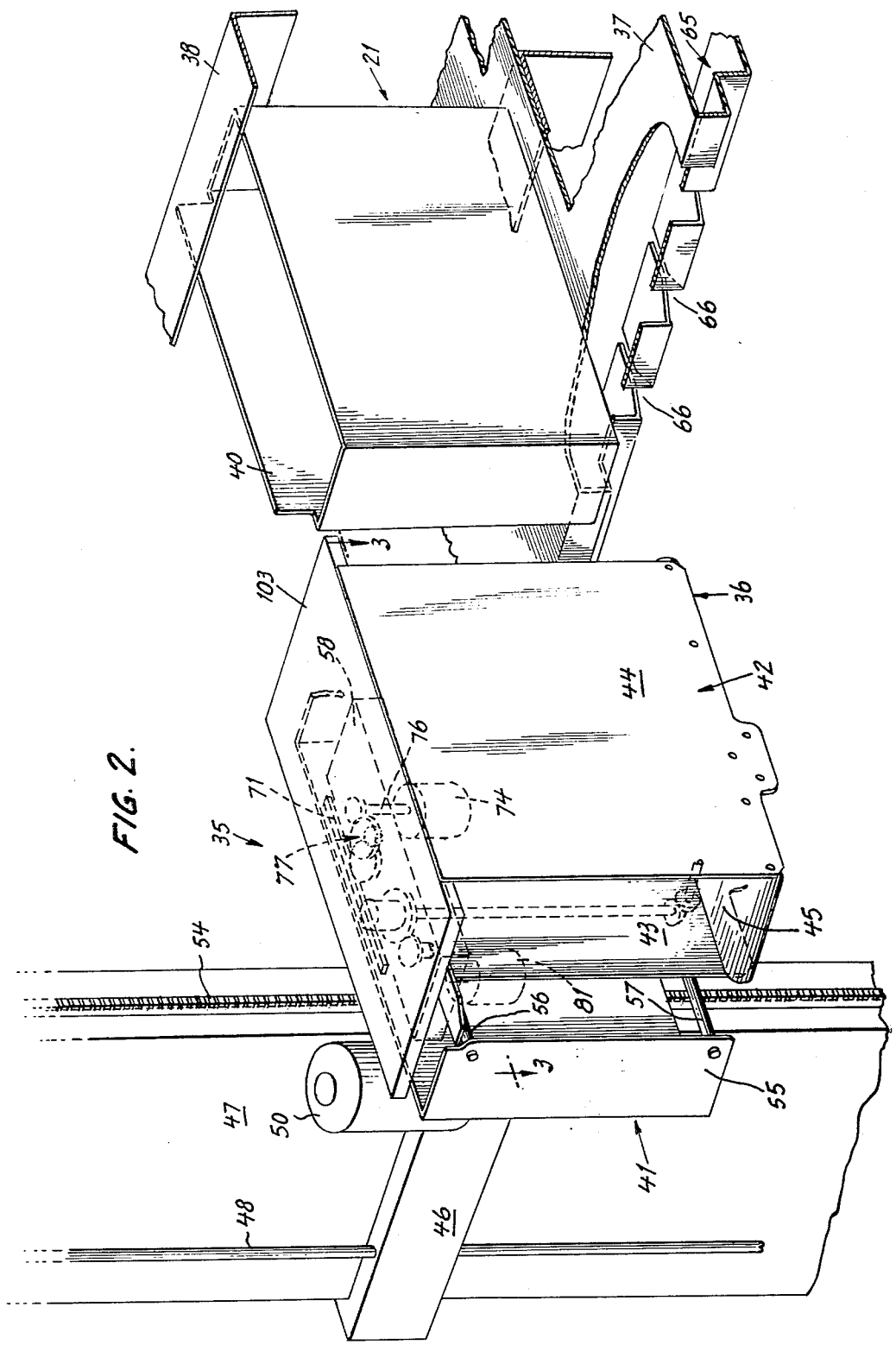
FIG. 2 is a diagrammatic perspective view of one embodiment of the extractor mechanism and an associated container.

As mentioned above the features of the present invention are such that only the structure of the extractor and an associated container need be developed in detail. To this end, FIG. 2 shows a perspective view in part of extractor mechanism 35, including a shuttle portion 36 disposed adjacent one container 21 resting on a shelf 37 at a depth limited by barrier 38. Container 21 is generally rectangular in configuration and includes an integral flange 40 extending upwardly therefrom. Only one shelf and container are shown for simplicity; however, FIG. 1 shows a complete complement of containers in a typical storage array which includes as many containers and shelves as may be desired.

The extractor mechanism 35 (FIG. 2) generally comprises a main body portion 41 free to move in a vertical direction, and shuttle portion 42 (also referred to herein as a shuttle) which moves with main body portion 41 and is also free to be reciprocably driven in a horizontal direction transverse to main body portion 41. Inner and outer plates 43 and 44, respectively, generally define the carrier section of shuttle 42 and provide an open-ended compartment generally conforming to the shape of container 21. The lower support surface of the carrier section comprises a continuous belt 45 supported between plates 43 and 44.

More specifically, extractor mechanism 35 includes support yoke 46 (FIGS. 2 and 3) slidably engaging the vertical column 47 of transport mechanism 22 illustrated in FIG. 1. A vertical guide rod 48 (FIG. 2) mounted on and parallel to column 47 can be employed to provide additional extractor stability. A vertical drive motor 50 drives a shaft 51 (FIG. 3) through miter gearing 52 to rotate a traveling gear 53 along a rack 54 secured to column 47, thereby providing means for translating extractor 35 in a vertical direction. The main body portion of extractor 35 includes a U-shaped support plate 55 secured to yoke 46 for movement therewith. An upper support rod 56 and a lower support rod 57 extend between the ends of support plate 55, upon which rods shuttle portion 42 is slidably supported for reciprocal motion in a direction transverse to vertical column 47 as mentioned above. Upper and lower support blocks 58 and 60, shown in FIGS. 4 and 5 are secured to inner shuttle plate 43. Bearing sleeves 61, 62 and 63, 64 for slidably receiving rods 56 and 57, respectively, are disposed in blocks 58 and 60. As an alternative either or both of the rod and block arrangements may be replaced by a rail and track arrangement functioning in a similar manner.

Prior to further describing the detailed aspects of the extractor structure, reference is made to FIG. 6 for a brief explanation of extractor operation in terms of the foregoing description, whereby the function and in turn the structure will become more apparent when returning to the detailed description. FIG. 6 schematically shows extractor mechanism 35, supported by column 47 adjacent a container 21 stored on a shelf 37 against a barrier 38 extending downwardly from shelf 37'. Each shelf includes a flange portion 65 (see FIG. 2), having slots 66 for receiving container flange 40 to define the storage position. It should be noted that a similar container 21' is stored across the aisle on an opposing shelf 37".

In an extraction operation extractor mechanism 35 is positioned adjacent a particular container 21, whereupon shuttle portion 42 is driven toward container 21 along rods 56 and 57 while main body portion 41 remains fixed with respect to column 47. When shuttle 42 arrives at the position illustrated, belt 45 engages the lower edge of container 21. Rotation of belt 45 in the direction indicated by arrow c lifts the container off shelf 37 and initiates withdrawal of container 21 in the direction of arrow d. In this position the cutaway portion of flange 40 prevents engagement between the nip of rollers 67 and 68 (FIGS. 3, 4 and 5), which flange is properly aligned therewith, as illustrated by the phantom outline 70 in FIG. 5. If necessary, slight misalignment is compensated for by the cleft between the receiving rollers. As shuttle 42 proceeds in the direction of arrow e, simultaneously with the initiated motion of container 21 in the direction of arrow d, rollers 67 and 68 (one or both of which are being driven in the direction that aids container travel) come into engagement with flange 40. Shuttle 42 ceases its inward excursion upon reaching an appropriate stop and the rollers and belt then continue in the extraction of container 21 from shelf 37 until the container is completely at rest at an approximate central position in the shuttle receiving component. The lifting action of belt 45 eliminates approximately one-half of the frictional drag between the shelf surface and the bottom surface of container 21, while the upper rollers aid in extraction and prevent misalignment between the shuttle compartment and the container, thus obviating edgewise jamming.

With container 21 centrally disposed in shuttle 42, the shuttle is driven along rods 56 and 57 back to its neutral position with respect to main body portion 41, and the extractor mechanism is translated to phantom position 27 (FIG. 1) for container delivery to operator work station 25, via conveyor 24. It should be noted that the above operation could be carried out equally as well to extract container 21' on the opposite side of the aisle, by driving shuttle 42 in the other direction with respect to main body portion 41 and by driving the rollers and belt 45 in opposite directions. It should also be noted that the refiling of a container to a preselected storage area involves a reversal of the extraction function to deposit a container from the shuttle compartment to the shelf. Slight misalignment during the refile operation is compensated for by the diverging portion of slots 66 (FIG. 2).

Figure 3:
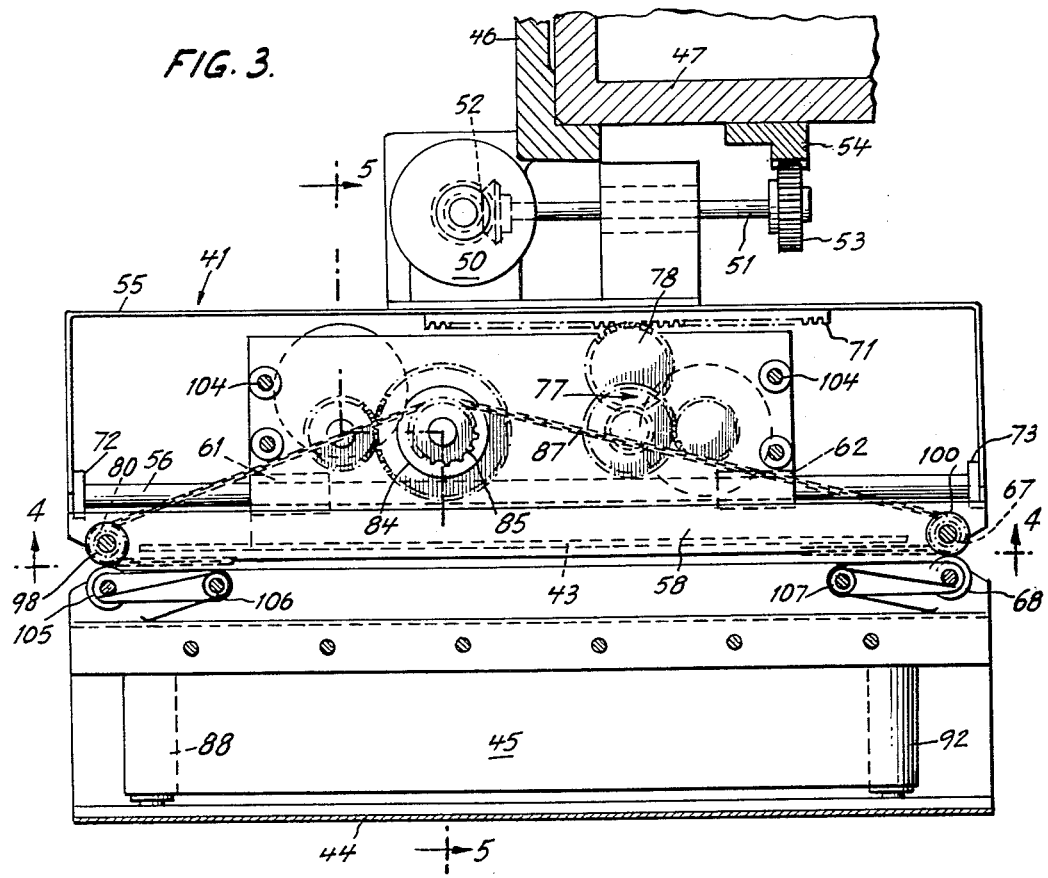
FIG. 3 is a sectional view taken along line 3—3 of FIG. 2.
Figure 4:
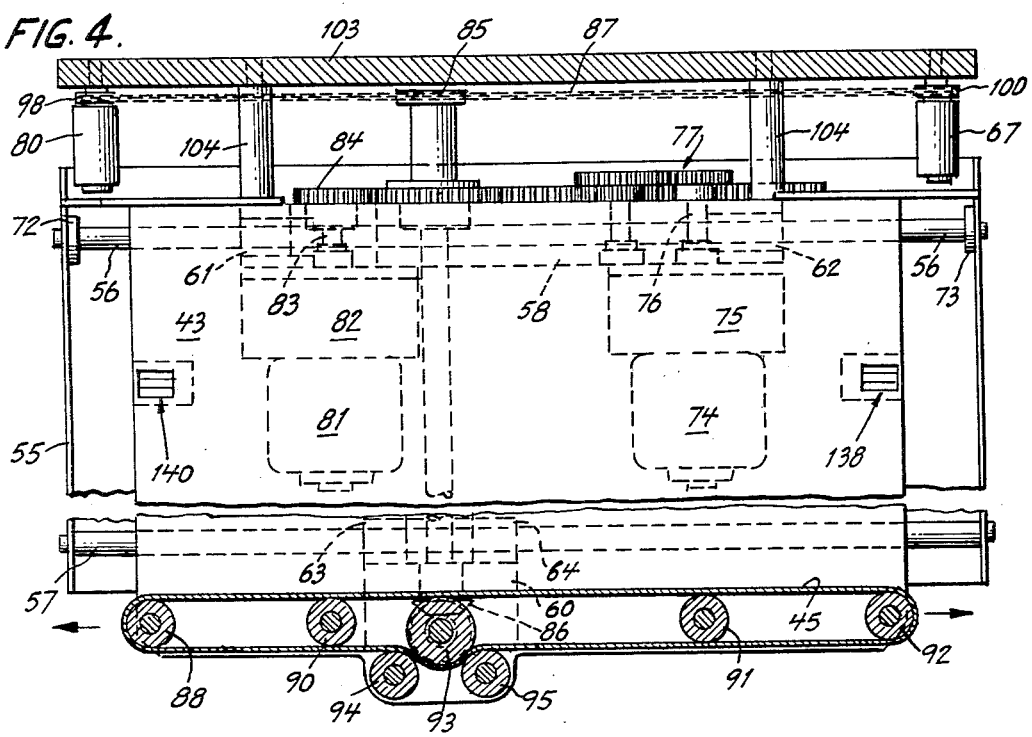
FIG. 4 is a sectional view taken along line 4—4 of FIG. 3.

The structure depicted in FIGS. 3–5 accomplishes the above described operation. Main body portion 41 (FIG. 3), attached to and driven with a yoke 46 along vertical column 47, includes U-shaped support plate 55 support rods 56 and 57 (only one of which is visible in FIG. 3) and a rack 71. Shuttle 42 is driven along rack 71. Mechanical limits for shuttle excursions are provided by bumpers 72 and 73. Bearing 61 contacts bumper 72 under conditions where shuttle 42 is driven to the left. Likewise, bearing 62 contacts bumper 73 when shuttle 42 is driven to the right. The drive mechanism for reciprocal shuttle drive is mounted on upper support block 58 and comprises a slide motor 74 (FIG. 4) a motor control unit 75, an output shaft 76 and a gear train 77, including an output gear 78 (FIG. 3) disposed for traveling engagement with rack 71 in a conventional manner. This shuttle drive arrangement provides for relative displacement between main body portion 41 and shuttle 42 whereby shuttle 42 is supported and reciprocally travels along rods 56 and 57. Motor control unit 75 includes a slip clutch mechanism which becomes effective upon both left or right limits of shuttle excursion, i.e, when the upper support block is driven against a bumper.

The drive mechanism for belt 45 and rollers 67 and 80 (FIG. 4) is also mounted on upper support block 58 which drive comprises a belt motor 81, a motor control unit 82, an output shaft 83, and a gear train 84. The shaft 83 (FIGS. 4 and 5) is coupled to a sprocket 85 and bevel gearing 86, the former providing drive for a drive chain 87, and the latter resulting in drive for belt 45. More specifically, belt 45 is mounted on idler rollers 88, 90, 91 and 92, and is driven by roller 93 urged in frictional engagement with belt 45 by aiding rollers 94 and 95. These belt rollers are journaled in roller mounting plates 96 and 97 (FIG. 5), attached respectively to the inner surfaces of inner shuttle plate 43 and outer shuttle plate 44.

Drive chain 87 extends continuously between driven sprocket 85 and pulleys 98 and 100. Sprocket 85 is rotatably mounted on upper support block 58 while the driven pulleys 98 and 100 extend downwardly on conventional journal means 101 and 102 secured to a top plate 103. Rollers 80 and 67 are mounted to rotate in concert with pulleys 98 and 100, respectively. Support studs 104 are provided to rigidly secure top plate 103 in spaced relationship with upper support block 58. Rollers 68 and 105 (FIG. 3) are also rotatably mounted by means extending downwardly from top plate 103. Spring biasing means 106 and 107 urge rollers 105 and 68, respectively, radially toward adjacent rollers 80 and 67, whereby the outer surfaces contact each other and provide a nip whereby flange 40 of container 21 (see FIG. 5) may be frictionally received therebetween. An alternative embodiment (not shown) would mount rollers 68 and 105 on stationary journal means with course gearing coupling between the adjacent driven rollers 80 and 67. In this instance the rollers must be constructed from a sufficiently resilient material to receive the flange of container 21.

If desired a segment of rollers 80 and 67 may be removed as illustrated in FIGS. 5a and 5b. This enables periodic release of the flange (FIG. 5b) whereupon the container is prevented from creeping upwardly away from belt 45.

A perspective view of a modified embodiment of the extractor mechanism of the present invention is shown in FIG. 7. The general function of this embodiment is the same as in the embodiment described above insofar as extraction and filing of containers are concerned; however, no bottom support belt is provided in the shuttle portion. A smaller package 108 is shown, whereupon only means engaging the flange thereof are necessary to transfer such container between the carrier portion 110 of the shuttle and storage means 111. It will become apparent from the following comments that the flange engaging means of the second embodiment are of a nature such that they are readily adapted for use with the first embodiment.

Figure 8:
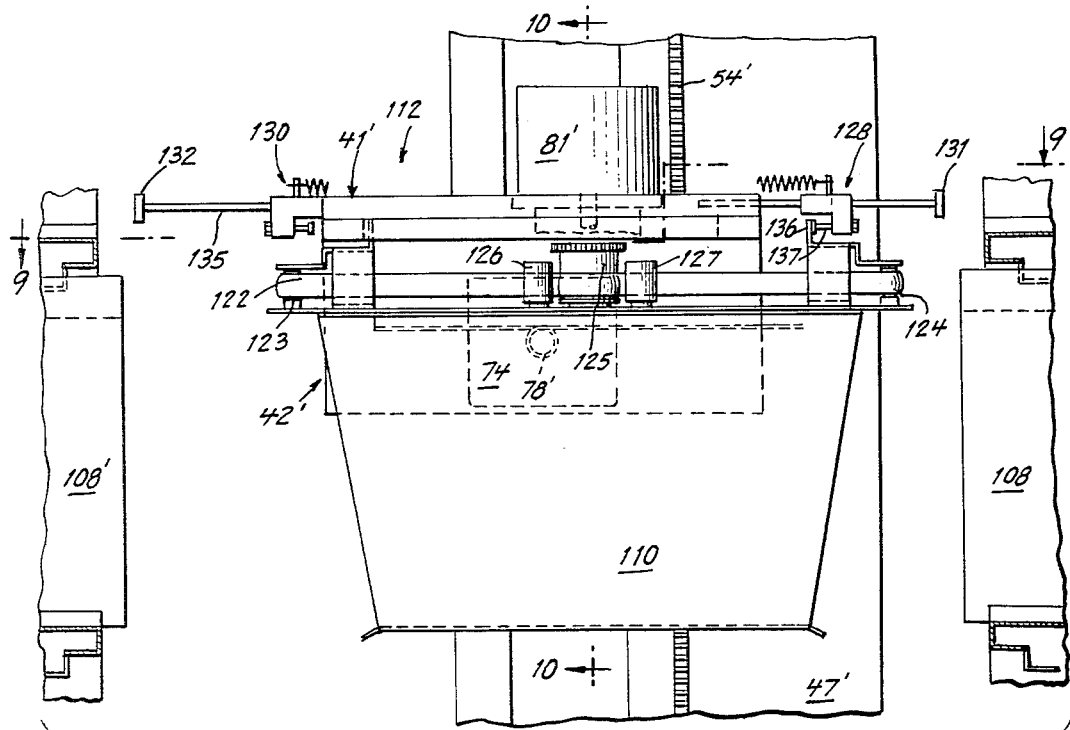
FIG. 8 is a detailed side view of the embodiment shown in FIG. 7.
Figure 9:
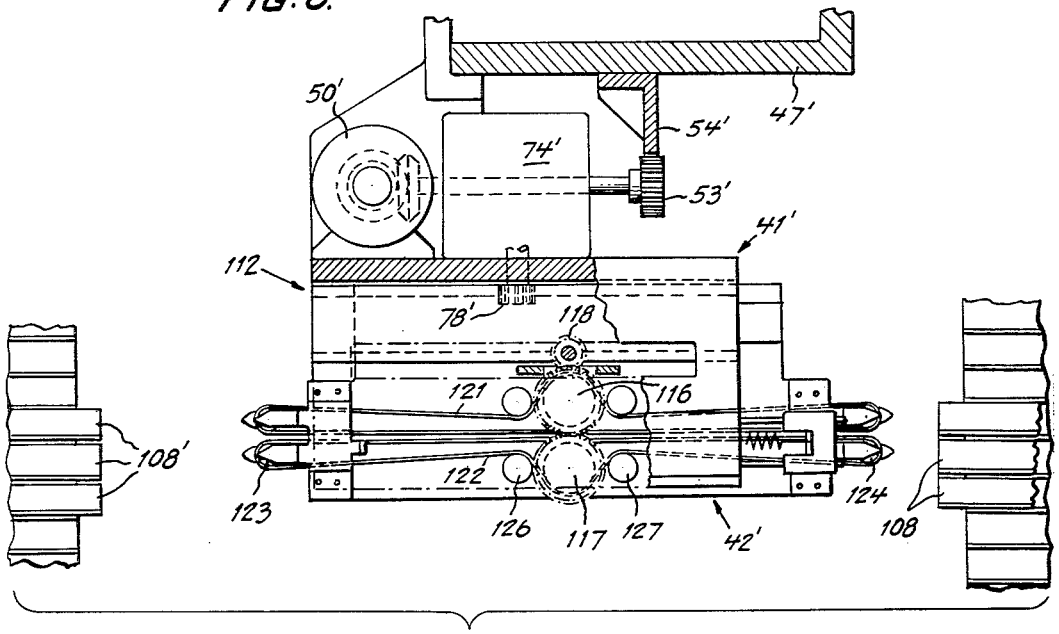
FIG. 9 is a sectional view taken along line 9—9 of FIG. 8.

The extractor 112 is positioned along mutually perpendicular axes in a manner similar to the positioning of the extractor described hereinabove. To this end FIGS. 8, 9 and 11 show column 47' along which extractor 112 is driven vertically by drive motor 50', by virtue of gear 53' and rack 54'.

In FIG. 7, extractor 112 is shown adjacent a container 108, having a configuration similar to that of container 21, i.e., a flange 40' extends from a rectangular body portion. Extractor 112 includes a main body portion 41' and a shuttle portion 42'. Carrier portion 110 defines an open ended compartment adapted to receive containers from both sides of an aisle. The latter relationship is illustrated in FIGS. 8 and 9. Shuttle 42' is reciprocated, with respect to the main body portion, by means of a rack 71' and gear 78' drive (FIGS. 8–11) in a manner similar to the first described embodiment. To this end, a slide motor 74' (FIG. 9) is provided for rotating gear 78' along rack 71', which results in translation of shuttle 42', along race and bearing arrangement 113 (FIGS. 10 and 11).

A motor 81' is mounted on shuttle 42' by mounting plate 114 and reciprocates therewith by virtue of clearance slot 115 (FIG. 7). The motor drive, which operates with the slip clutch feature described above, drives gears 116 and 117 via gear 118 mounted on motor shaft 120. Engagement of container flange 40' in this instance is provided by frictional belts 121 and 122. Mounting means for belt 122 includes idler rollers 123 and 124, driven spool 125 and tensioning rollers 126 and 127. Similar mounting means are provided for belt 121.

Stop means 128 (FIG. 8) limits shuttle excursion to the right and stop means 130 limits leftward excursion. Bumpers 131 and 132 are provided to stop the excursion of spring biased slides 133 and 134, respectively. The slide 133 during a right excursion, for example, is pulled along rod 135 with shuttle 42' by flange 136 extending for engagement with button 137 adjustably mounted on slide 133. The leftward excursion of shuttle 42' is limited in a similar manner. Thus, it can be seen that the second embodiment includes the same basic structure as the principal embodiment with the exception of the omission of the bottom belt for lighter containers and with the further modification of a flange receiving belt (rather than flange receiving rollers) for pulling a container to the shuttle compartment and for discharging a container from the shuttle, such as in a filing operation.

Overall operation of the present invention will now be described in light of the preceding functional description of the extractor as it relates to the article handling apparatus shown in FIG. 1. The FIG. 2 embodiment will be considered in that more steps are involved in the operation thereof, it being apparent that similar considerations would be required for operation of the second embodiment. FIG. 12 is a sequence chart describing the general operation of both "pull" and "file" operations. The extractor is initially resting at any preselected home position. Upon the entry of coded instructions at control unit 34, the horizontal and vertical drives position extractor 23 adjacent the container located in the storage area corresponding to selected coded positional data. The extractor 23 involved then removes the requested container from the left or right shelf in the aisle (as described in the extractor operation above) and travels to phantom position 27 for deposit of the container on conveyor 24 for delivery to operator work station 25. A "pull" cycle is then completed by return of the extractor to the original home position and clearance of the input control unit for accepting new instructions.

In a "file" operation the sequence of steps are initiated by entry of input instructions at operator control unit 34, whereupon extractor 23 is driven to a suitable pickup location, illustrated by phantom outline 30, and return conveyor 28 delivers a container to the shuttle compartment. The horizontal and vertical drives then transport the container until the container is juxtaposed adjacent the container's preselected destination, the container is discharged onto the storage shelf (right or left) and finally the horizontal and vertical drives are energized to return the extractor to the original home position, whereupon the input unit is again cleared and ready to accept new instructions. It should be noted that second return conveyor 31 functions in a similar manner to service the second storage aisle, and likewise any additional number of aisles can be employed with a like number of return conveyors.

FIGS. 13 and 14 illustrate in detail the extraction and filing operations performed by extractor 35 in light of the specific time sequencing relationship of the slide motor 74 and belt motor 81. In FIG. 13 a left extraction operation is illustrated and in FIG. 14 a left discharge operation is illustrated. Similar charts for right extraction and file operations are not shown in view of the same steps except for obvious drive reversals required for carrying out such opposite operations. The vertical coordinates in FIGS. 13 and 14 represent speed in left and right directions along a time base represented by the horizontal axis. The broken line is a plot of slide motor speed, i.e., speed of shuttle translation, and the solid line is a plot of belt motor speed, i.e., linear speed at which the belt 45 is driven.

More specifically in FIG. 13 the broken line shown that slide motor moves the shuttle leftwardly at speed $x$. At time $a$ belt motor 81 moves belt 45 rightwardly at speed $y$, which is greater than speed $x$. Subsequently the lower belt engages the selected container, followed immediately by roller engagement with the flange of the selected container. The slide motor continues to tend to drive the shuttle in a leftward direction (even though slipping occurs) until a limit switch 138 (FIG. 4) senses the extracted container. At this time the belt motor stops and the direction of slide motor is reversed to remove the shuttle in a direction away from the shelf until the shuttle is centered in the extractor, at which time the shuttle motor is deenergized and the extractor mechanism is transported to a position adjacent the pull conveyor, as explained in the above general description of the sequencing chart (FIG. 12).

In the same manner FIG. 14 illustrates slide motor (broken line) drive with respect to belt motor drive (solid line) during a left discharge operation. It should be noted that the slide motor reaches its slip position, i.e., shuttle driven against limit stop, before the belt motor has driven the container half way out of the shuttle compartment. During time interval $b$, belt motor 81 continues to discharge the container while slide motor 74 slips tending to drive the shuttle in a leftward direction. When a limit switch 140 senses the absence of the container (as indicated), slide motor 74 reverses direction and drives the shuttle away from the storage shelf at a speed lower then the speed that the belt motor speed, which accordingly tends to continue the discharge of the container and prevents incomplete discharge of the container. Finally the rollers and container flange disengage, followed immediately by disengagement between the lower belt and container. Ultimately, the shuttle is centered and slide motor stops, whereupon the extractor is returned to its home position.

We claim:

1. In article handling apparatus having a remote operator station, the combination comprising,
    (a) a plurality of article carrying containers, each having a flange member extending outwardly therefrom,
    (b) means for storing said containers,
    (c) means for translating a selected container between the operator station and said storage means,
    (d) said translating means comprising an extractor mechanism including a shuttle portion for accommodating said container, drive means for selectively positioning said shuttle adjacent any selected one of said plurality of containers, said extractor further including second drive means, means responsive to said second drive means for engaging said flange of said selected container, and third drive means for urging said shuttle from said adjacent position toward the selected container to effect engagement between said engaging means and the selected container, and means for transferring the container between said storage means and said shuttle in response to energization of said second drive means.

2. In article handling apparatus as set forth in claim 1 wherein each of said containers comprises a unit from which said flange member extends outwardly said engaging means comprise first and second rollers, said first roller operably coupled to said second drive means for rotation of said first roller, and means for mounting said rollers in side-by-side relationship, whereby said flange member is received by the nip provided therebetween under conditions where said shuttle is urged from said adjacent position toward the selected container.

3. In article handling apparatus as set forth in claim 1 wherein each of said containers comprise a unit having a flange member extending outwardly therefrom, said engaging means comprise a first continuous belt and means for mounting said belt on said shuttle, said mounting means adapted for rotation by said second drive means, said engaging means further comprising a second continuous belt, and second means for mounting said second belt on said shuttle in spaced relationship with respect to said first belt, whereby said first and second mounting means permit said belts to frictionally receive therebetween the flange member of the selected unit for effecting said transfer.

4. In article handling apparatus as set forth in claim 1 wherein said second drive means includes means for reciprocally driving said transfer means for transfer of the selected container between said storage means and said shuttle mechanism, and said third driving means is adapted to return said shuttle from said urged position adjacent the selected container to said adjacent position upon completion of said transfer.

5. In article handling apparatus as set forth in claim 4 wherein each of said containers comprise a rectangular unit from which said flange extends outwardly, said storage means comprise at least one stack of vertically spaced shelves for laterally receiving said units in side-by-side relationship, said storage means further include barrier means for limiting the depth to which said units are received by said storage means to less than the unit length, whereby the stored units extend from the shelf edges when received thereon, said transfer means includes a horizontally extending continuous belt reciprocally driven by said second drive means and means for mounting said horizontal belt to initially engage the under surface of the extending end of said selected unit for transferring said unit when said shuttle is urged toward the unit, whereby said selected unit is supported by said horizontal belt during said transfer.

6. In article handling apparatus as set forth in claim 5 wherein said shuttle mechanism further includes means for sensing the position of said unit upon transfer of said unit from said support means to said horizontal belt, and control means connected to said sensing means for disengaging said second drive means in response to the sensed position of a transferred unit.

7. In an automatic article filing system having a remote operator work station, the combination comprising,
 (a) a plurality of substantially rectangular storage containers each having a flange member extending outwardly therefrom and adapted to carry one or more articles therein,
 (b) support means comprising at least one pair of opposing stacks of vertically spaced shelves for laterally receiving said storage containers in side-by-side relationship thereon, barrier means attached to said shelves to limit the depth to which said storage containers are received to less than the unit length, whereby the storage containers extend from the shelf edges when received thereon,
 (c) transport means for conveying the storage containers between the work station and said support means,
 (d) said transport means comprising an extractor mechanism,
 (e) said extractor including a shuttle portion and means for positioning said shuttle a predetermined distance adjacent the exposed end of any one of said storage containers,
 (f) said shuttle including a container receiving compartment, transfer means comprising a horizontally extending continuous belt, and second drive means for reciprocally driving said horizontal belt, and said transport means further comprising third drive means for alternately urging or retracting said shuttle from or to said adjacent position with respect to said one storage container to effect initial engagement or disengagement, respectively, between said belt and the under surface of the extending end of said one storage container for transferring the unit between the support means and said shuttle belt, said shuttle further including means for sensing said container upon transfer thereof to said compartment and control means connected to said sensing means for disengaging said second drive means in response to said sensing means, and
 (g) said shuttle further including means for engaging said flange member of guiding said container under conditions where said container is being transferred by said belt.

8. In an automatic article filing system as set forth in claim 7 wherein said transport means further comprise means for translating said shuttle along mutually perpendicular axes spaced midway between said opposing stack pairs, whereby said shuttle in said adjacent position is spaced equally between opposing shelves.

9. In an automatic article filing system as set forth in claim 7 wherein said engaging means further include means for aligning said one of said storage containers with said compartment under conditions where said container is being transferred between said shuttle and said support means.

10. In an automatic article filing system as set forth in claim 9 wherein said engaging means comprises at least one pair of resilient rollers and means for mounting said rollers in spaced relationship on said shuttle, said rollers being disposed to receive in the nip therebetween the flange member subsequent to engagement between said belt and said under surface.

11. In an automatic article filing system as set forth in claim 10 and including means for coupling said second drive means to rotatably drive at least one of said resilient rollers in concert with said belt.

12. In article handling apparatus as set forth in claim 2 wherein said first roller is provided with a removed segment to provide periodic release of said flange during engagement between said rollers.

13. In article handling apparatus as set forth in claim 5 wherein said engaging means comprise first and second rollers, said first roller operably coupled to said second drive mean for rotation thereof, and means for mounting said rollers in side-by-side relationship, whereby said flange member is received by the nips provided therebetween under conditions where said unit is engaged by said belt.

References Cited

UNITED STATES PATENTS

| | | | |
|---|---|---|---|
| 2,386,520 | 10/1945 | Watson et al. | |
| 2,670,860 | 3/1954 | Cogings. | |
| 2,714,440 | 8/1955 | Forty et al. | 198—167 |
| 2,751,093 | 6/1956 | Theibault. | |
| 2,899,086 | 8/1959 | De St.-Andre. | |
| 2,918,656 | 12/1959 | Nolde et al. | |
| 3,049,247 | 8/1962 | Lemelson | 214—16.4 |
| 3,174,637 | 3/1965 | Flynn | 214—310 |
| 3,292,804 | 12/1966 | Veneman | 214—620 X |
| 3,297,379 | 1/1967 | Artaud et al. | 312—223 |

FOREIGN PATENTS 895,638   5/1962   Great Britain.

GERALD M. FORLENZA, Primary Examiner
R. B. JOHNSON, Assistant Examiner

U.S. Cl. X.R.

214—11, 16.4